(12) United States Patent
White

(10) Patent No.: US 10,607,514 B1
(45) Date of Patent: Mar. 31, 2020

(54) TRAFFIC HANDHELD CONTROL WARNING SIGN

(71) Applicant: Victor White, Missouri City, TX (US)

(72) Inventor: Victor White, Missouri City, TX (US)

( * ) Notice: Subject to any disclaimer, the term of this patent is extended or adjusted under 35 U.S.C. 154(b) by 0 days.

(21) Appl. No.: 16/389,757

(22) Filed: Apr. 19, 2019

(51) Int. Cl.
| | |
|---|---|
| *G08G 1/095* | (2006.01) |
| *G09F 9/33* | (2006.01) |
| *G09F 21/02* | (2006.01) |
| *G08G 1/0955* | (2006.01) |
| *G06F 3/14* | (2006.01) |
| *E01F 9/692* | (2016.01) |

(52) U.S. Cl.
CPC .............. *G09F 9/33* (2013.01); *E01F 9/692* (2016.02); *G06F 3/1423* (2013.01); *G08G 1/0955* (2013.01); *G09F 21/02* (2013.01)

(58) Field of Classification Search
CPC .......... G09F 13/02; G09F 27/00; G09F 25/00; G09F 9/33; G08G 1/07; G08G 1/0955
USPC ................................ 340/908, 916, 907, 927
See application file for complete search history.

(56) References Cited

U.S. PATENT DOCUMENTS

| | | | | |
|---|---|---|---|---|
| 6,147,623 A * | 11/2000 | Rippen | ................ | G08G 1/0955 340/907 |
| 6,150,957 A * | 11/2000 | Henz | ...................... | G08G 1/095 340/321 |
| 6,198,410 B1 * | 3/2001 | White | .................... | G09F 9/307 340/907 |
| 7,233,259 B2 * | 6/2007 | Gibson | ................. | G08B 5/006 340/907 |
| 2007/0113445 A1 * | 5/2007 | Chambless | ............ | G09F 21/02 40/586 |
| 2007/0209255 A1 * | 9/2007 | Armwood | .............. | G09F 21/02 40/586 |
| 2009/0079588 A1 * | 3/2009 | Graham | ................ | G08B 5/006 340/908 |
| 2012/0216436 A1 * | 8/2012 | Adair | ...................... | G08G 1/07 40/559 |

\* cited by examiner

*Primary Examiner* — Toan N Pham
(74) *Attorney, Agent, or Firm* — B. Alicia Johnson

(57) ABSTRACT

A Traffic Handheld Control Warning Sign including a first and second display sign which are fastened together and have the capability to display different traffic control warnings and commands simultaneously. The invention is battery powered and can be controlled by a separate or built in remote control. The invention can be hand held or can be used hands free by placing it in a tripod or pole and operating it with a remote control from a distance of up to 40 meters.

5 Claims, 6 Drawing Sheets

TRAFFIC HANDHELD CONTROL WARNING SIGN

FIELD

The present embodiment generally relates to a traffic handheld control warning sign.

BACKGROUND

A need exists for a traffic handheld control warning sign. The present embodiments meet these needs.

BRIEF DESCRIPTION OF THE DRAWINGS

The detailed description will be better understood in conjunction with the accompanying drawings as follows.

Figure 1:
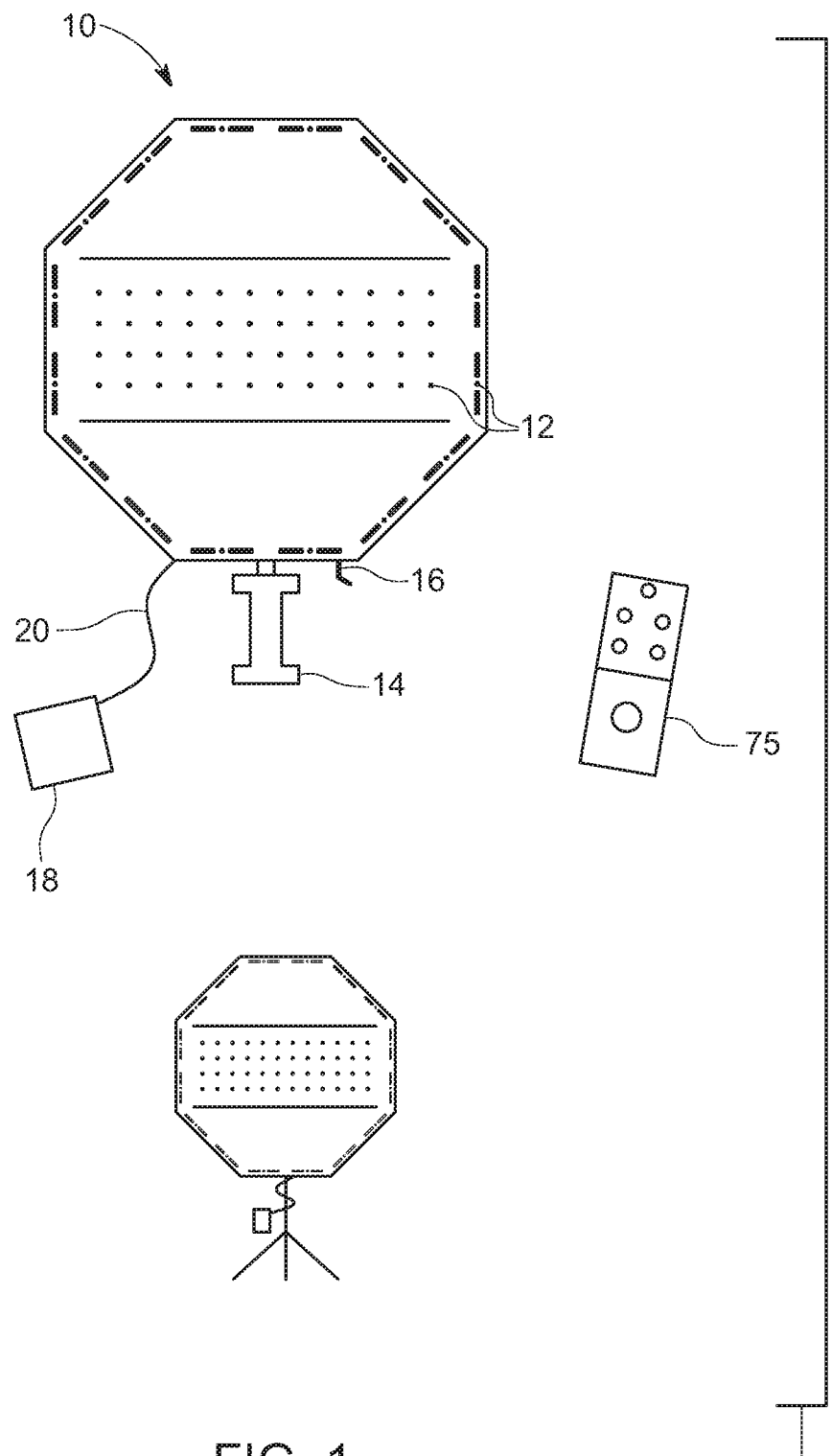
FIG. 1 depicts a front view of the traffic handheld control warning sign along with the remote control.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

Traffic control devices have been used in many instances for many decades. The purpose is to convey a message to a driver in order to control the flow of traffic. In instances where the freeway is closed due to construction and one police officer is trying to control traffic, that is quickly becoming a very unsafe condition for the officer, as well as the motorist, traffic control signs are useful.

Especially at night when it is dark due to highway lights being off, or because of construction.

In many instances, out of two officers trying to control traffic only one may have a flashlight. A flashlight can work well at getting a driver's attention, but it doesn't communicate what the officer wants you to do, plus the flashlight can blind a driver when pointed or shined in the face. Also, if another officer has nothing in their hand and only one of them has a reflective vest on, it can be very difficult to see the officers or understand the path of travel they wanted you to take. This undermines officers ability to secure their own safety, as well as subpar effectiveness on controlling the traffic flow.

The Traffic Handheld Control/Warning Sign is beneficial because it greatly increases the safety of the officers, while controlling traffic with better visibility and superior communication.

The Traffic Handheld Control Warning Sign is beneficial for school districts with school crossing guards, that protect children in poor visual conditions such as darkness, poor lighting, rainy, foggy or inability to see the crossing guard.

An industry that will also benefit from the safety aspect of the Traffic Handheld Control Warning Sign is the Road Construction Industry. These are the company's that work on streets and highways across the country.

The Traffic Handheld Control/Warning Sign would be a must for this industry because the unique and innovative use of two signs in one and one person controlling them by remote.

The Traffic Handheld Control Warning Sign has the capability of being controlled by a remote. The Traffic Handheld Control Warning Sign can be placed at the locations where construction workers wish to control traffic flow. In this case, all that is needed is one person to monitor the traffic flow and remotely start and stop traffic in anyway, to keep the traffic flowing smoothly. Today it takes two individuals to control alternating traffic on a partially closed street, with the Traffic Handheld Control Warning Sign, it only takes one individual.

By using one person instead of two to control traffic flow, construction companies are able to cut cost and have less people out in the field. This is beneficial because it reduces the risk of injuries to construction workers through safety by non-exposure.

The invention disclosed herein is beneficial to many markets including but not limited to school districts for school crossing guards, whose job is to safety guard children across the street. The sign is more visible for motorist during early morning and adverse conditions, making it a safer interchange between people and automobiles; Law enforcement where there are many police departments across the nation, that deal with motorist on the streets and byways, Communications is a must and the better the communicating, the safer the roads are; Emergency respond for when emergency personnel are first on the scene and need to secure traffic control; Fire department where Fireman block the streets and traffic control is needed; the military when they need to control traffic.

The disclosed invention is beneficial In the case of emergency such as hurricane or any event that results in the loss of power. The invention can be used as a temporary traffic four way stop light at intersections. The invention can be hung from the traffic light cross arm support (the same arm as the red, green and yellow lights hang) and turned on with its own power supply flashing only the word STOP until the normal power is restored.

The invention prevents death because it helps to communicate to drivers what instructions to follow in order to provide a safe flow of traffic.

The invention prevents the death of children walking to school in the morning in conditions where visibility is low such as heavy fog and darkness.

The invention disclosed herein is a A traffic Handheld Control Warning Sign.

The invention has a first and second display sign with up to 8 sides on the outer perimeter.

The invention has a plurality of center support h-shaped brackets connecting the first and second display signs together in a parallel fashion, the center support brackets having h grooves and a nut on the top and bottom which allows screws to be fastened to said brackets, allowing the brackets to hold the first and second display signs together.

The invention has circuitry located in between the first and second display signs which allows for the traffic handheld control warning sign to operate.

The invention has a plurality of centered uniform perforated holes on both the first and second display signs which coincide with the center support brackets for a secure fit.

The invention has a plurality of LED lights arranged on the the outside of the first and second display signs as well as along the perimeter of both the first and second display signs.

The invention has a plurality of perforated holes on both the first and second display signs which function to hold the LED lights in place.

The invention has a plurality of h-shaped outer support brackets arranged along the perimeter of the first and second display signs connecting the first and second display signs.

The invention has a plurality of outer uniform perforated holes on both the first and second display signs which coincide with the h-shaped outer support brackets for a secure fit.

The invention has a switch located at the bottom of the traffic handheld control warning sign which turns the sign on and off.

The invention has a 12V DC battery supply connected to the sign by an electrical cord.

The invention has a handle bracket located at the bottom of the traffic handheld control warning sign with a nut for the handle and holes for mounting, the bracket functioning as overall support for the traffic handheld control warning sign, mounting the switch, and a home for the power supply inlet.

The invention has a power supply inlet located in the bracket which provides 12 volts DC power to the traffic handheld control warning sign.

The invention has a dc-dc power converter which brings the distributed voltage down to a functioning level for the traffic handheld control warning sign.

The invention has a computer board located inside of the traffic handheld control warning sign which functions to designate various displays for the traffic handheld control warning sign.

The invention has a removable handle located at the bottom of the traffic handheld control warning sign to enable a user to easily hold the traffic handheld control warning sign.

Finally, the invention has a separate remote control as well as a remote control receiver for operating warning signals on the first and second display sign which can be used at a distance of up to 40 meters.

In embodiments, the remote can be built into the traffic handheld control warning sign instead of being separate.

In embodiments, the handle of the traffic handheld control warning sign can be hollow and placed in a pole or tripod for mounting, enabling a user to use and operate the traffic handheld control warning sign without holding it.

In embodiments, the shape of the traffic handheld control warning sign can be a circle, triangle, square, pentagon, hexagon or octagon.

In embodiments, the computer of the traffic handheld control warning sign can be programmed to display custom messages such as "stop", "go", "slow", "left", or "right", or directional arrows.

Now turning to the figures.

FIG. 1 depicts a front view of the traffic handheld control warning sign along with the remote control.

A traffic handheld control warning sign 10 is shown.

A first and second display sign make up both sides of the traffic handheld control warning sign 10.

A plurality of LED lights 12 are arranged on the the outside of the first and second display signs as well as along the perimeter of both the first and second display signs.

A 12V DC battery supply 18 is connected to the sign by an electrical cord 20 as shown in FIG. 1.

A removable handle 14 located at the bottom of the traffic handheld control warning sign 10 is used to enable a user to easily hold the traffic handheld control warning sign.

A switch 16 located at the bottom of the traffic handheld control warning sign, which turns the sign on and off, is also shown in FIG. 1.

FIG. 1 shows separate remote control 75 for operating warning signals on the first and second display sign which can be used at a distance of up to 40 meters.

Additionally, FIG. 1 shows an embodiment of the invention wherein the handle is hollow and placed in a pole or tripod for mounting, enabling a user to use and operate the traffic handheld control warning sign without holding it.

Figure 2:
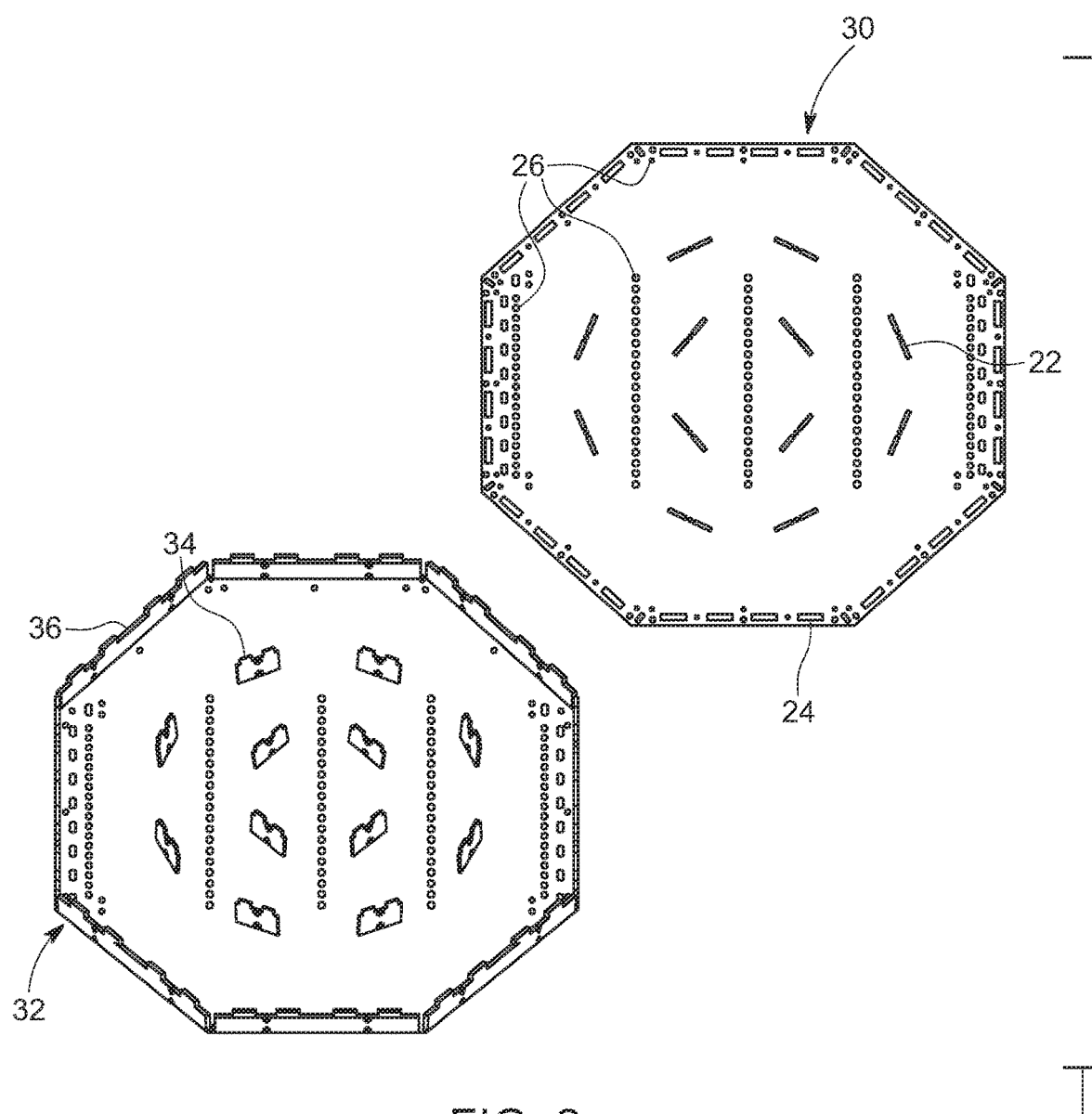
FIG. 2 depicts the first and second display sign of the traffic handheld warning sign.

Now Turning to FIG. 2. FIG. 2 depicts the first and second display sign of the traffic handheld warning sign.

A first 30 and second 32 display sign with up to 8 sides on the outer perimeter are shown in FIG. 2.

A plurality of center support h-shaped brackets 34 connecting the first and second display signs together in a parallel fashion, the center support brackets having h grooves 50 and a nut 52 (shown in FIG. 3) on the top and bottom which allows screws to be fastened to said brackets, allowing the brackets to hold the first 30 and second 32 display signs together are shown in this figure.

FIG. 2 also shows a plurality of centered uniform perforated holes 22 on both the first and second display signs which coincide with the center support brackets for a secure fit.

FIG. 2 shows a plurality of perforated holes 26 on both the first and second display signs which function to hold the LED lights in place.

FIG. 2 also shows a plurality of h-shaped outer support brackets 36 arranged along the perimeter of the first and second display signs connecting the first and second display signs together.

FIG. 2 shows a plurality of outer uniform perforated holes 24 on both the first and second display signs which coincide with the h-shaped outer support brackets 36 for a secure fit.

Figure 3:
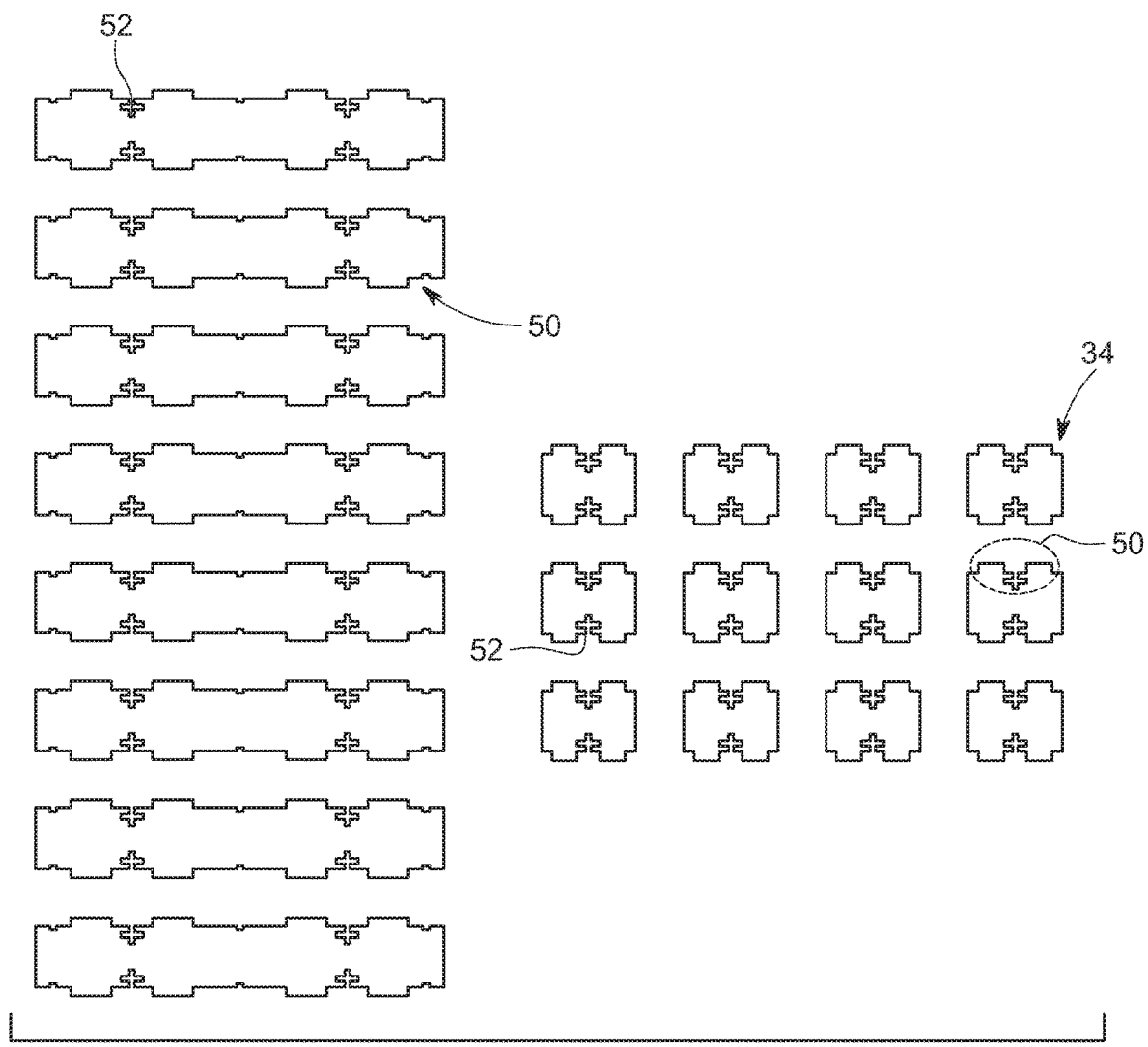
FIG. 3 depicts a view of the center support h-shaped brackets.

Now turning to FIG. 3. FIG. 3 depicts a view of the center support h-shaped brackets.

Outer support brackets 36, and center support brackets 34 are shown in detail in this figure.

Both the center support brackets 34 and the outer support brackets 36 have H-grooves 50 and a nut 52 on the top and bottom which allows screws to be fastened to said brackets, allowing the brackets to hold the first 30 and second 32 display signs together.

Figure 4:
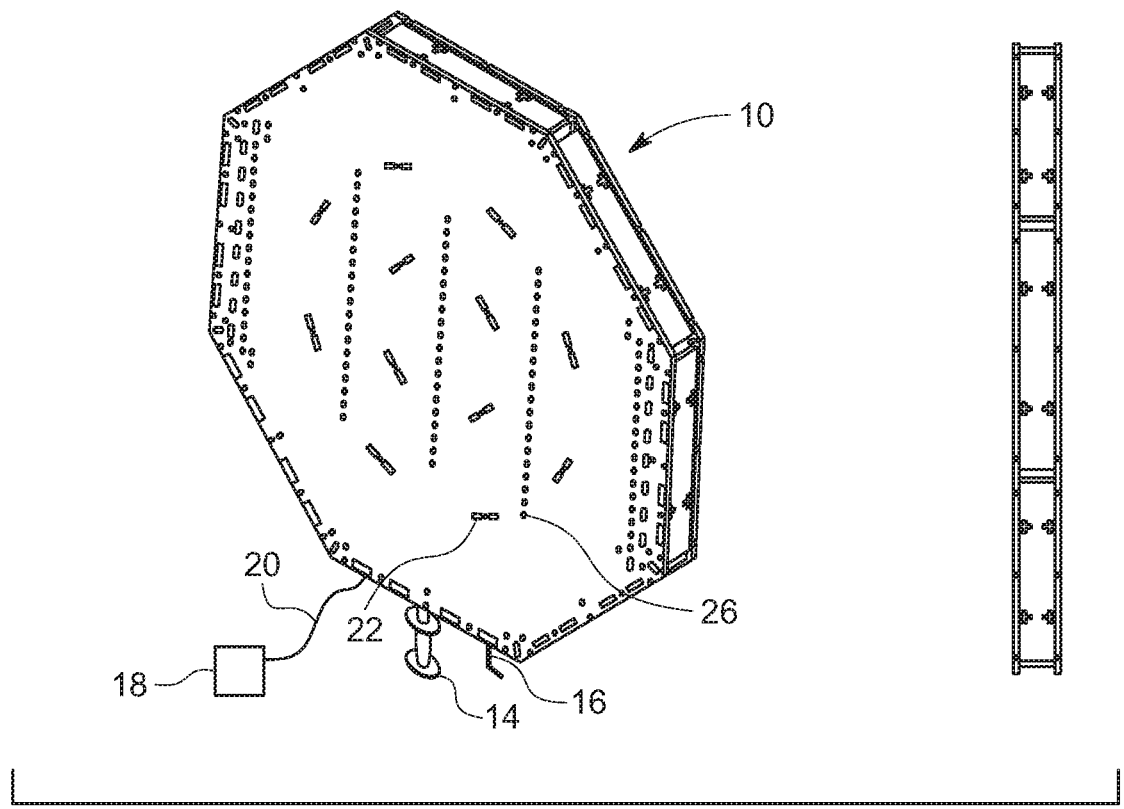
FIG. 4 depicts a side view of the traffic handheld control warning sign.

Now turning to FIG. 4. FIG. 4 depicts a side view of the traffic handheld control warning sign 10.

From the side view, the first 30 and second 32 display signs are shown fastened together. While assembled in this manner, the traffic handheld control warning sign 10 can operate to display various traffic control warnings and commands.

Each of the first 30 and second 32 display signs can display a different control warning or command from that which is being displayed on the opposite side. Display custom messages such as "stop", "go", "slow", "left", "right" or directional arrows can be shown on the first 30 and second 32 display signs.

The traffic handheld control warning sign 10 can be manufactured in many different shapes such as a circle, triangle, square, pentagon, hexagon or octagon.

Figure 5:
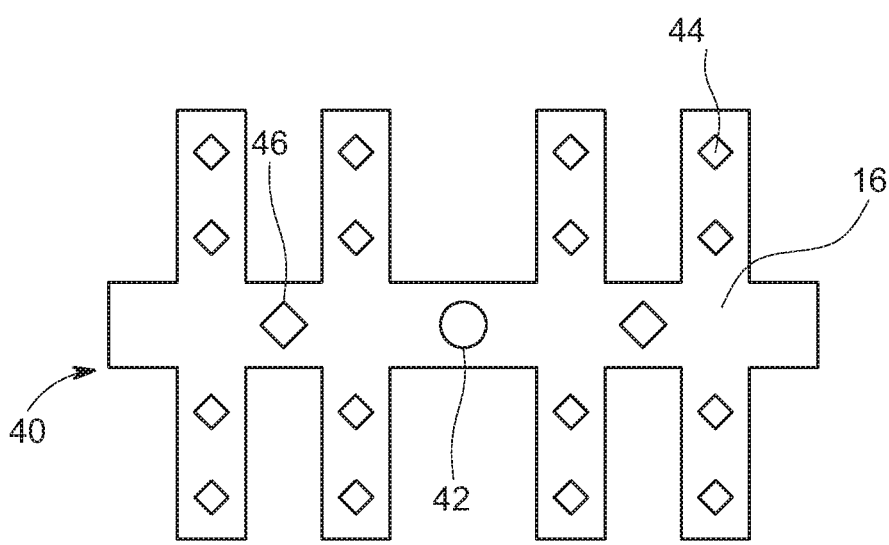
FIG. 5 depicts a view of the handle bracket.

Turning now to FIG. 5. FIG. 5 depicts a view of the handle bracket.

A handle bracket 40 is located at the bottom of the traffic handheld control warning sign 10.

The handle bracket 40 has a nut for the handle 42 and holes for mounting 44 the bracket to the traffic handheld control warning sign 10.

The bracket functions as overall support for the traffic handheld control warning sign, mounting the switch 16, and a home for the power supply inlet 46.

The power supply inlet 46 is located in the bracket which provides 12 volts DC power to the traffic handheld control warning sign.

Figure 6:
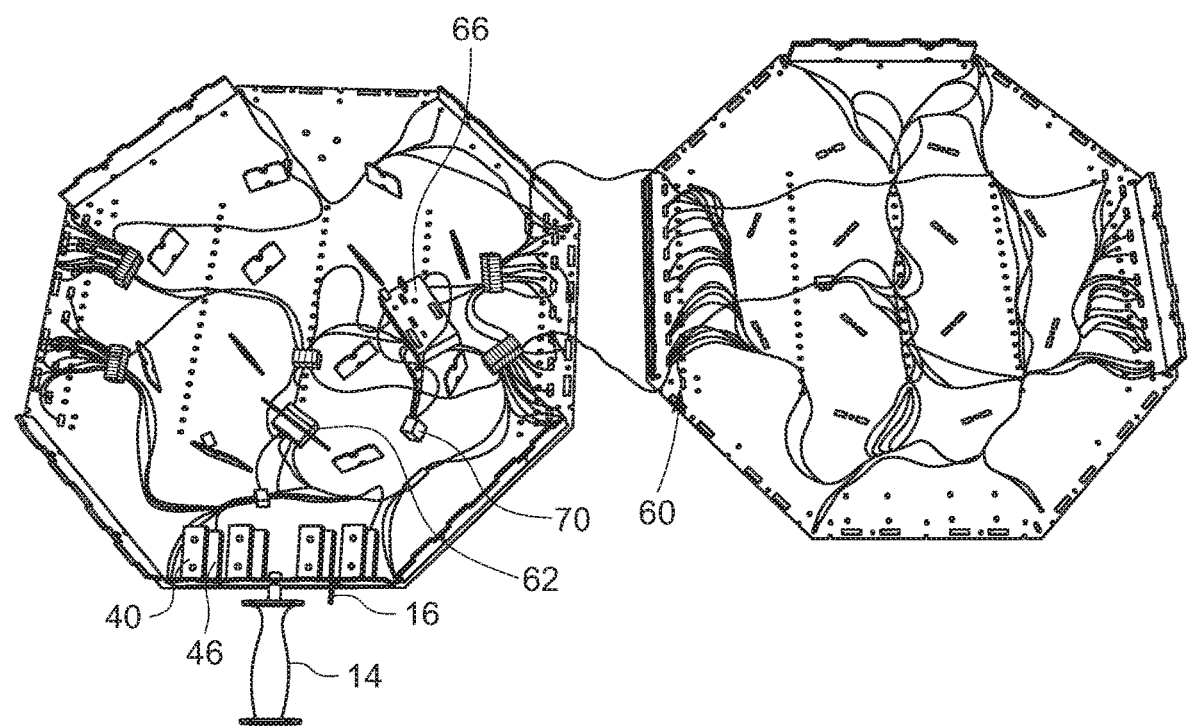
FIG. 6 depicts and inside view of the traffic handheld control warning sign.

Now turning to FIG. 6. FIG. 6 depicts and inside view of the traffic handheld control warning sign.

FIG. 6 shows circuitry 60 located in between the first and second display signs which allows for the traffic handheld control warning sign to operate.

FIG. 6 also shows a dc-dc power converter 62 which brings the distributed voltage down to a functioning level for the traffic handheld control warning sign.

Also shown in this figure is a computer board 66 located inside of the traffic handheld control warning sign which functions to designate various displays for the traffic handheld control warning sign.

Also show in the remote control receiver 70.

The LED lights in the traffic handheld control warning sign have the capability to flash and can be outlined in red or yellow LED lights, to correspond with the associated words.

The Traffic Handheld Control Warning Sign has bright LED lights which can be any color such as red green yellow or blue, spelling words such as 'STOP'.

Again, the Traffic Handheld Control Warning Sign's bright LED lights are visible from a long distance, approximately up to 40 meters.

While these embodiments have been described with emphasis on the embodiments, it should be understood that within the scope of the appended claims, the embodiments might be practiced other than as specifically described herein.

What is claimed is:

1. A traffic Handheld Control Warning Sign comprising:
   a. a first and second display sign with up to sides on an outer perimeter which have the capability to display up to two different traffic control warnings or commands simultaneously;
   b. a plurality of center support h-shaped brackets connecting the first and second display signs together in a parallel fashion, the center support brackets having h grooves and a nut on the top and bottom which allows screws to be fastened to said brackets, allowing the brackets to hold the first and second display signs together;
   c. circuitry located in between the first and second display signs which allows for the traffic handheld control warning sign to operate;
   d. a plurality of centered uniform perforated holes on both the first and second display signs which coincide with the center support brackets for a secure fit;
   e. a plurality of LED lights arranged on the outside of the first and second display signs as well as along the perimeter of both the first and second display signs;
   f. a plurality of perforated holes on both the first and second display signs which function to hold the LED lights in place;
   g. a plurality of h-shaped outer support brackets arranged along the perimeter of the first and second display signs connecting the first and second display signs;
   h. a plurality of outer uniform perforated holes on both the first and second display signs which coincide with the h-shaped outer support brackets for a secure fit;
   i. a switch located at the bottom of the Traffic Handheld Control Warning sign which turns the sign on and off;
   j. a 12V DC battery supply connected to the sign by an electrical cord;
   k. a handle bracket located at the bottom of the traffic handheld control warning sign with a nut for the handle and holes for mounting, the bracket functioning as overall support for the traffic handheld control warning sign, mounting the switch, and a home for a power supply inlet;
   l. the power supply inlet located in the bracket which provides 12 volts DC power to the traffic handheld control warning sign;
   m. a dc-dc power converter which brings a distributed voltage down to a functioning level for the traffic handheld control warning sign;
   n. a computer board located inside of the traffic handheld control warning sign which functions to designate various displays for the traffic handheld control warning sign;
   o. a removable handle located at the bottom of the traffic handheld control warning sign to enable a user to easily hold the traffic handheld control warning sign;
   p. a separate remote control for operating warning signals on the first and second display sign which can be used at a distance of up to 40 meters; and
   q. a remote control receiver located between the first and second display signs.

2. The traffic handheld control warning sign of claim 1, wherein the remote is built into the traffic handheld control warning sign instead of being separate.

3. The traffic handheld control warning sign of claim 1, wherein the handle is hollow and placed in a pole or tripod for mounting, enabling the user to use and operate the traffic handheld control warning sign without holding it.

4. The traffic handheld control warning sign of claim 1, wherein the shape of the traffic handheld control warning sign is a circle, triangle, square, pentagon, hexagon or octagon.

5. The traffic handheld control warning sign of claim 1, wherein the computer is programmed to display custom messages comprising; "stop", "go", "slow", "left", "right", or directional arrows.

* * * * *